United States Patent [19]
Hayashi

[11] Patent Number: 4,732,459
[45] Date of Patent: Mar. 22, 1988

[54] FAST TELEPHOTO LENS

[75] Inventor: Kiyoshi Hayashi, Yokohama, Japan

[73] Assignee: Nippon Kogaku K. K., Tokyo, Japan

[21] Appl. No.: 6,279

[22] Filed: Jan. 20, 1987

Related U.S. Application Data

[63] Continuation of Ser. No. 633,297, Jul. 23, 1984, abandoned.

[30] Foreign Application Priority Data

Jul. 27, 1983 [JP] Japan .................. 58-137379

[51] Int. Cl.⁴ ............................................. G02B 9/00
[52] U.S. Cl. .................................. 350/454; 350/475
[58] Field of Search ............... 350/454, 453, 457, 475

[56] References Cited

U.S. PATENT DOCUMENTS 4,348,084  9/1982  Kitagishi et al. ............... 350/454
4,518,229  5/1985  Yasukuni ......................... 350/454

Primary Examiner—John K. Corbin
Assistant Examiner—P. M. Dzierzynski
Attorney, Agent, or Firm—Shapiro and Shapiro

[57] ABSTRACT

A fast telephoto lens has a longer focal length of 300 to 400 mm, and an F-number of about 2.0 to 2.8, which does not utilize a floating mechanism, has a small deviation in aberration when the lens is focused on an object, and has a simple construction for shifting only one lens group. The fast telephoto lens is of internal focusing type and comprises positive, negative and positive lens groups from the object side, and only the negative (second) lens group is shifted to obtain an in-focus state.

15 Claims, 18 Drawing Figures

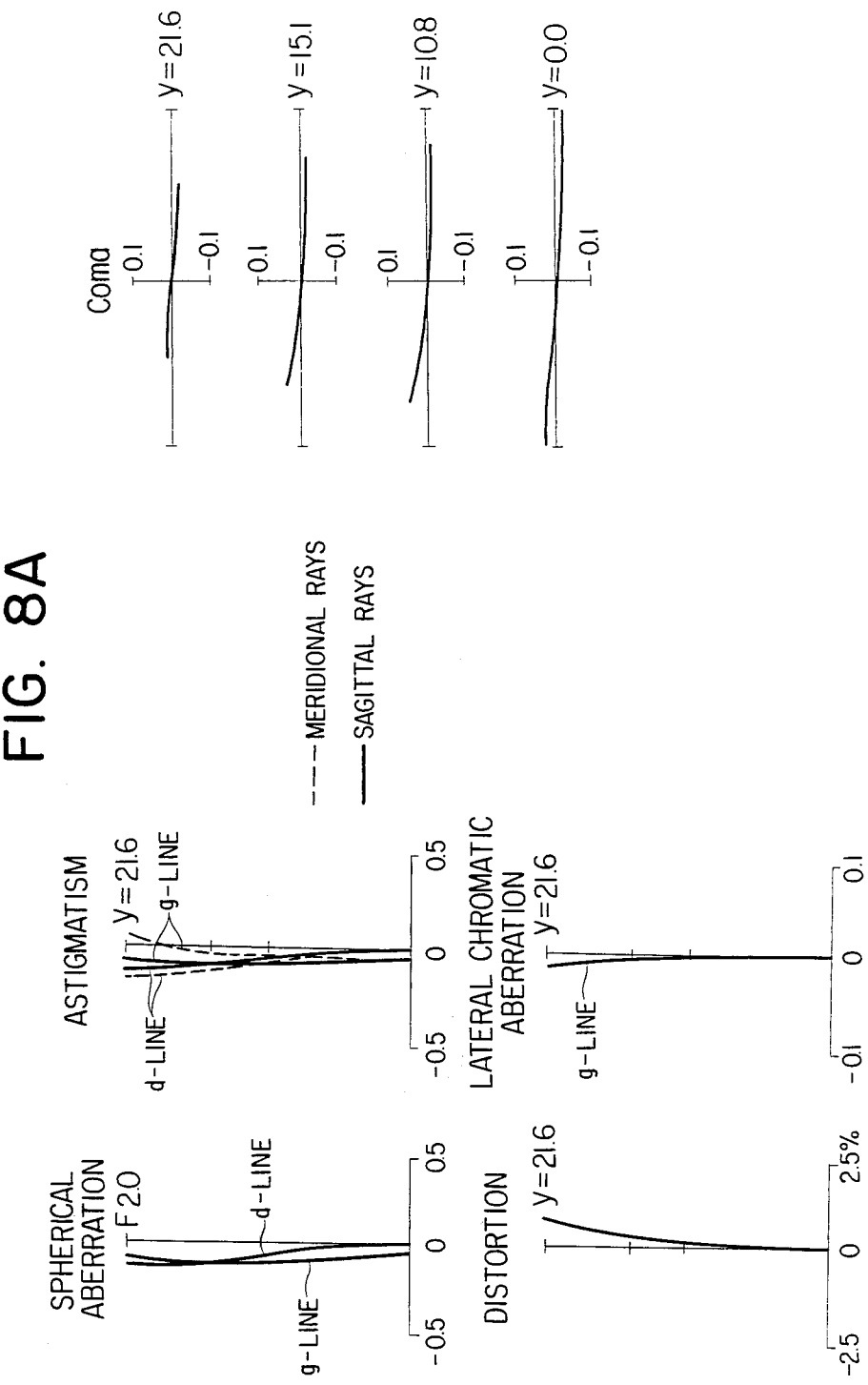

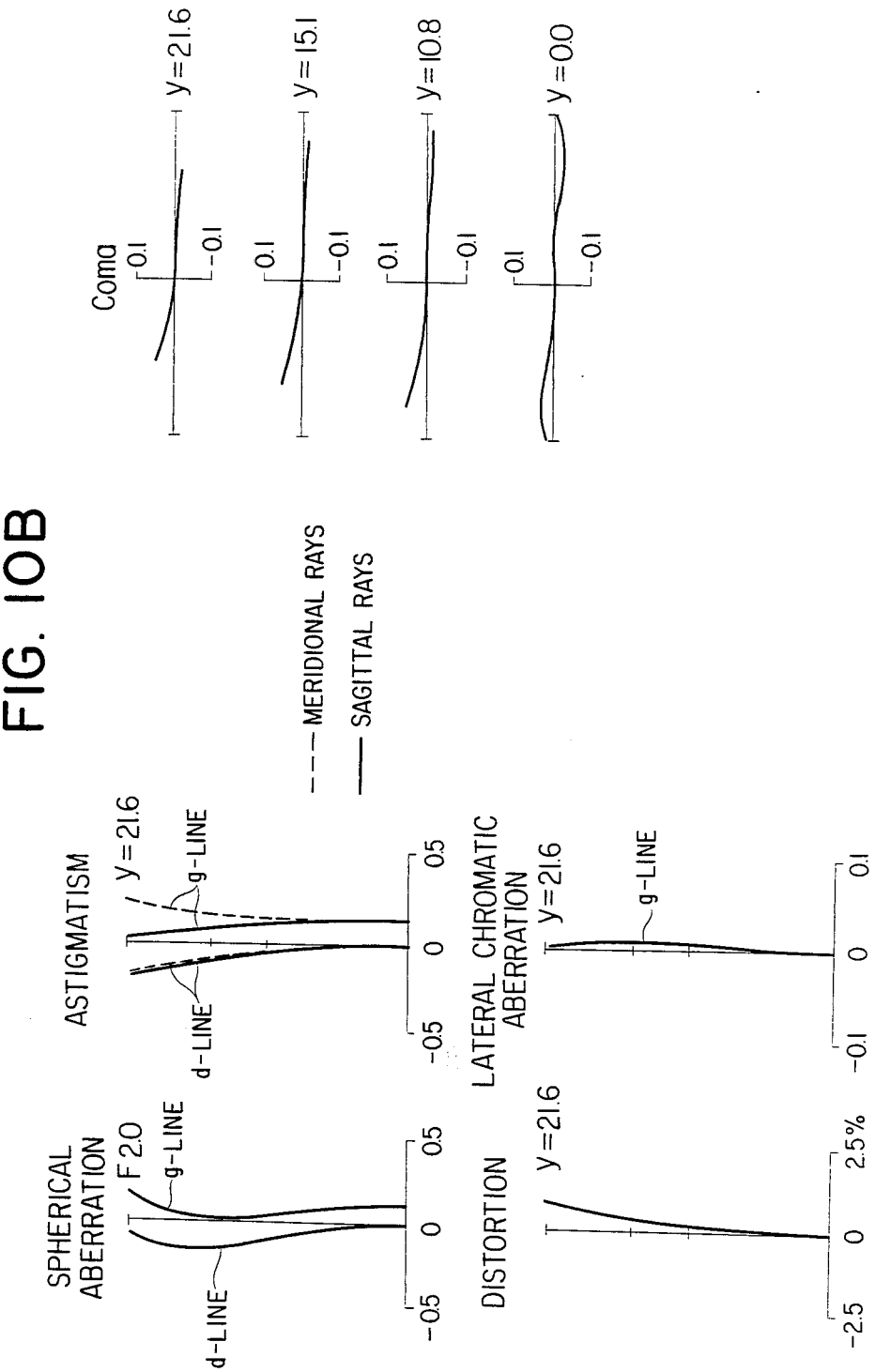

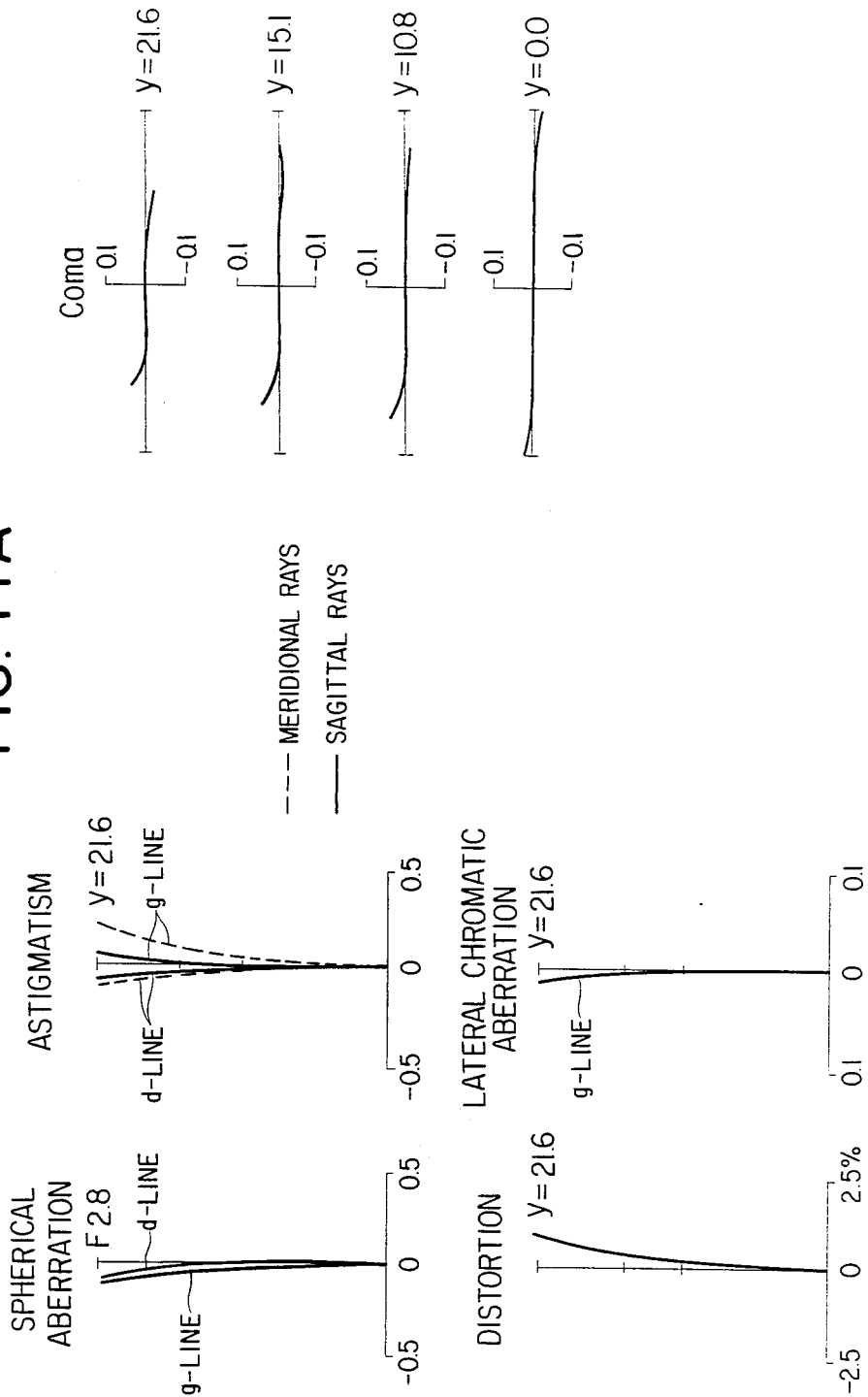

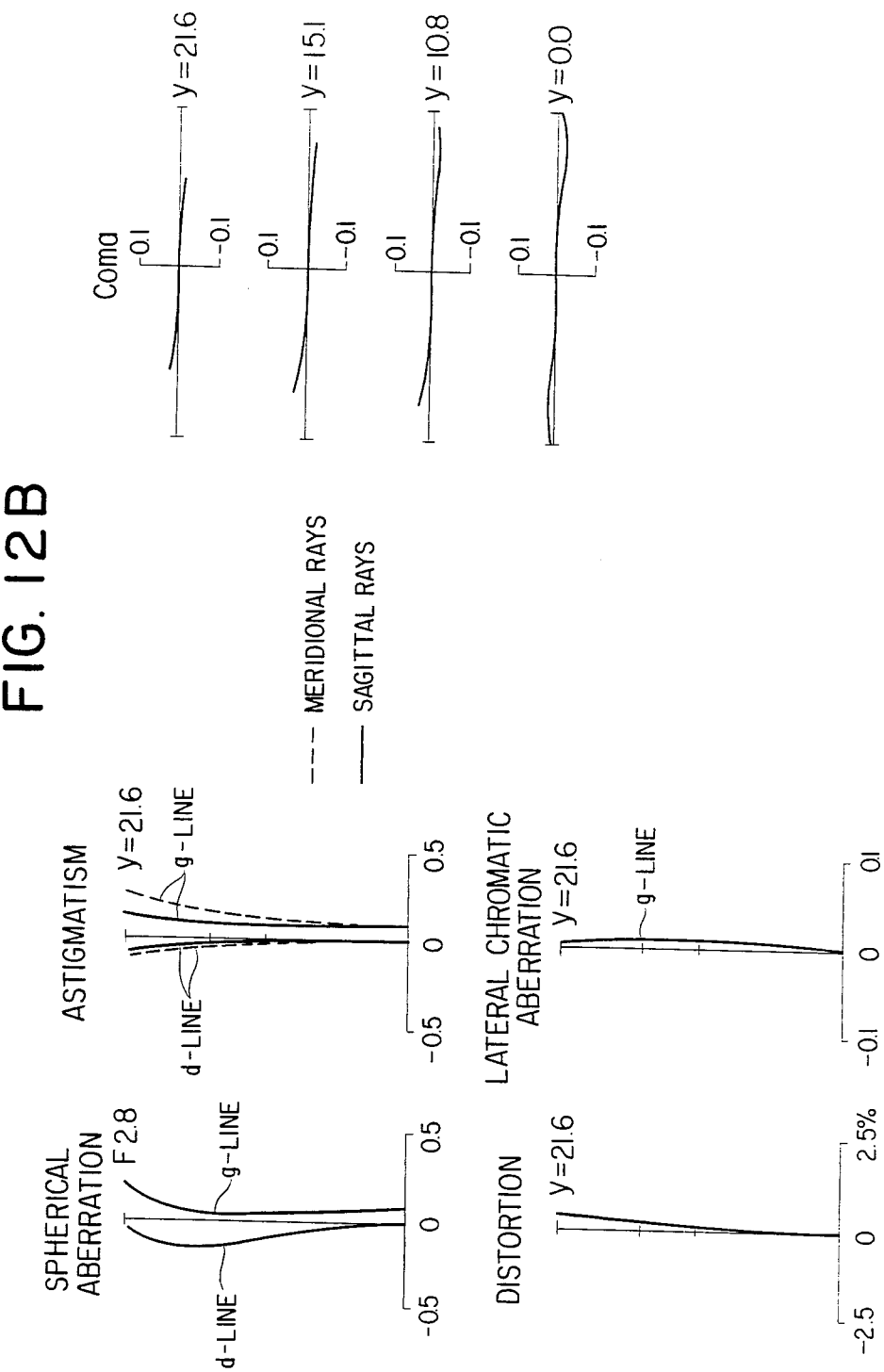

FAST TELEPHOTO LENS

This is a continuation application of Ser. No. 633,297 filed July 23, 1984, now abandoned.

BACKGROUND OF THE INVENTION

1. Field of the Invention

The present invention relates to a fast telephoto lens.

2. Description of the Prior Art

Fast telephoto lenses for still cameras, especially 35-mm still cameras have been demanded for indoor sports photography since strobes cannot be used for this purpose. In addition, indoor sports are played in a limited space, so a closest focusing distance image magnification is required to be about −0.1. In order to satisfy the above needs, pictures must be taken will full-aperture, resulting in a decrease in a focal depth. Therefore, a high-performance telephoto lens having no deviations in aberration from infinity to the closest focusing distance when full-aperture is performed is needed.

A conventional telephoto lens having an F-number of 2.0 and is disclosed in U.S. Pat. No. 4,176,913, assigned to the assignee of the present invention. This telephoto lens has a maximum focal length of about 200 mm. When the telephoto lens is focused on an object at the closest focusing distance, a plurality (two or three) of lens groups are shifted at different speeds by a floating mechanism, thereby obtaining a telephoto lens having an F-number of 2.0 and a focal length of 250 mm. However, at present, the floating mechanism is complicated, thus providing a complicated and large mechanism, and the deviations in aberration are not sufficiently corrected.

SUMMARY OF THE INVENTION

It is an object of the present invention to provide a telephoto lens which has a longer focal length of 300 to 400 mm, and an F-number of about 2.0 to 2.8, which does not utilize a floating mechanism, has a small deviation in aberration when the lens is focused on an object, and has a simple construction for shifting only one set of lens groups.

In principle, the fast internal focusing telephoto lens according to the present invention comprises positive, negative and positive lens groups from the object side and only the negative (second) lens group is shifted to obtain an in-focus state. A new lens configuration is found in these lens groups.

More specifically, the internal focusing telephoto lens according to the present invention comprises a first converging lens group G1, a diverging lens group G2 and a second converging lens group G3. When the telephoto lens is focused on an object at infinity, the first converging lens group G1 and the diverging lens group G2 constitute an afocal system, and the diverging lens group G2 is shifted toward the image, thereby focusing the telephoto lens from the object at infinity to the closest focusing distance. The first converging lens group G1 includes at least two positive lens components and a negative lens component from the object side. The diverging lens group G2 includes two negative lens components. At least one of these negative lens components comprises an achromatic lens component consisting of a positive lens and a negative lens adhered to the positive lens or slightly spaced apart from the positive lens. The second converging lens group G3 comprises at least one achromatic lens component consisting of a negative lens and a positive lens adhered to the negative lens or slightly spaced apart from each other.

BRIEF DESCRIPTION OF THE DRAWINGS

FIGS. 7A and 7B to FIGS. 12A and 12B show various aberrations of the first to sixth embodiments, respectively, in which FIGS. 7A to 12A show the aberrations in the infinity in-focus state, and FIGS. 7B to 12B show aberrations in the closest distance in-focus state.

DETAILED DESCRIPTION OF THE PREFERRED EMBODIMENTS

Preferred embodiments of the present inventions will be described with reference to the accompanying drawings.

Figure 1:
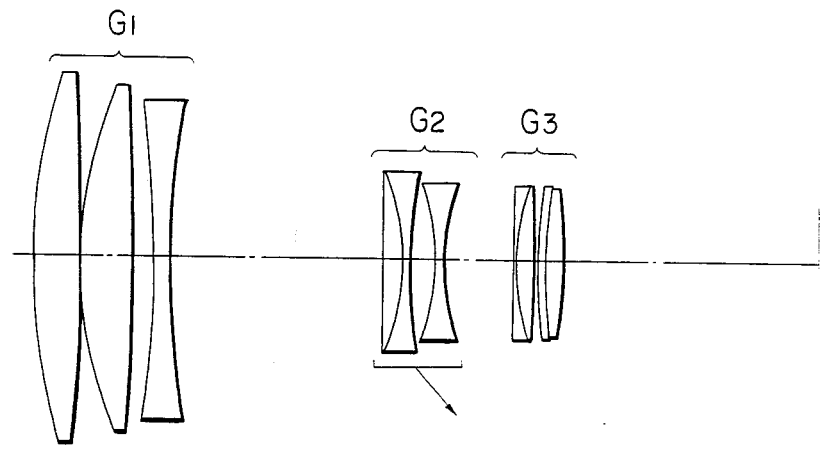
FIGS. 1 to 6 show lens configurations of telephoto lenses according to first to sixth embodiments of the present invention, respectively.

According to the arrangement of lens components in FIG. 1, a first converging lens group G1 comprises two positive lens components and one negative lens component which are arranged from the object side. A diverging lens group G2 comprises an achromatic component and a negative lens component which are sequentially arranged from the object side. This achromatic component consists of positive and negative lens components. A second converging lens group G3 comprises two achromatic components each of which consists of positive and negative lens components adhered to each other.

Figure 2:
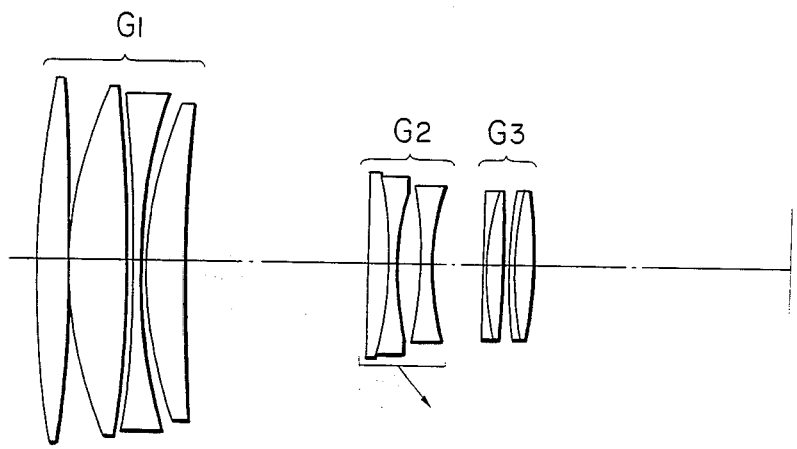

According to the arrangement of lens components in FIG. 2, a meniscus lens component having a convex surface opposing the object side is additionally arranged at the image side of the first converging lens group G1 of FIG. 1.

Figure 3:
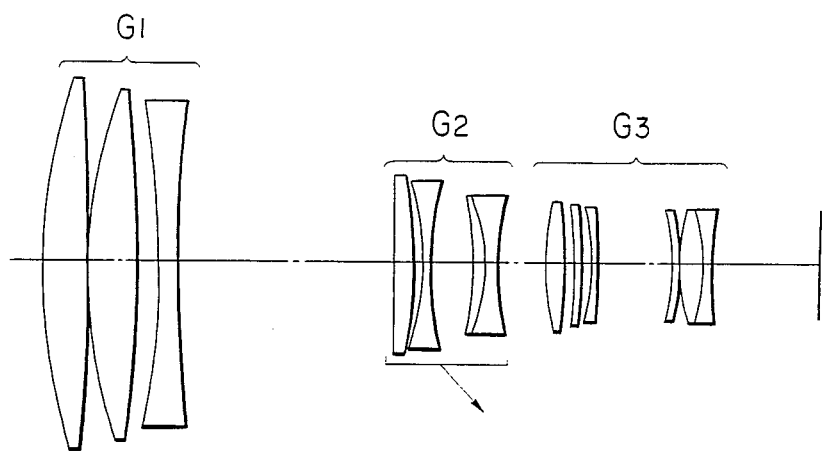

According to the arrangement of lens components in FIG. 3, a diverging lens group G2 and a second converging lens group G3 have arrangement different from those in FIG. 1. More specifically, the diverging lens group G2 comprises a positive lens component and a negative lens component which are sequentially arranged from the object side and an achromatic lens component consisting of positive and negative lens components adhered to each other from the object side. The second converging lens group G3 comprises, in order from the object side, a positive lens component, a positive meniscus lens component having a convex surface opposing the image side, a negative meniscus lens component having a convex surface opposing the image side, a negative meniscus lens component having a convex surface opposing the image side, and an achromatic lens component consisting of a positive lens component and a negative lens component which are sequentially arranged from the object side and are adhered to each other.

Figure 4:
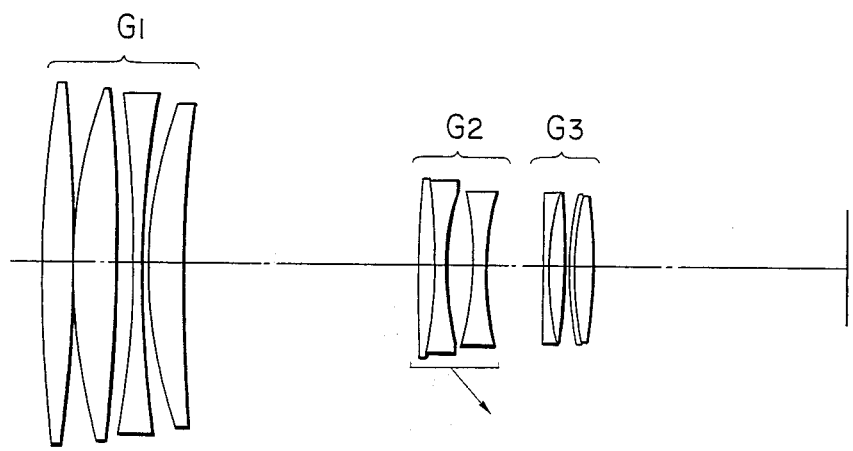

The arrangement of the lens components shown in FIG. 4 is substantially the same as that in FIG. 2.

Figure 5:
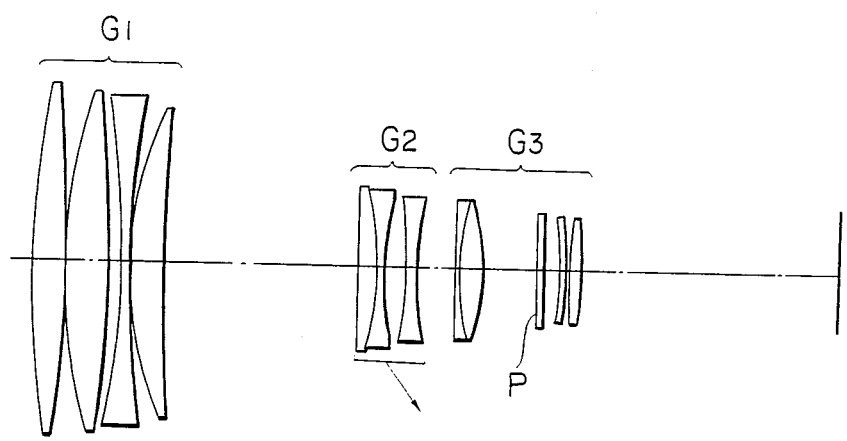

The arrangement of the lens components shown in FIG. 5 is substantially the same as that in FIG. 4, except that a second converging lens group G3 comprises an achromatic lens component consisting of a negative lens and a positive lens which are sequentially arranged from the object side and which are adhered to each other, a filter P, a negative meniscus lens component having a convex surface opposing the image side, and a positive lens component.

Figure 6:
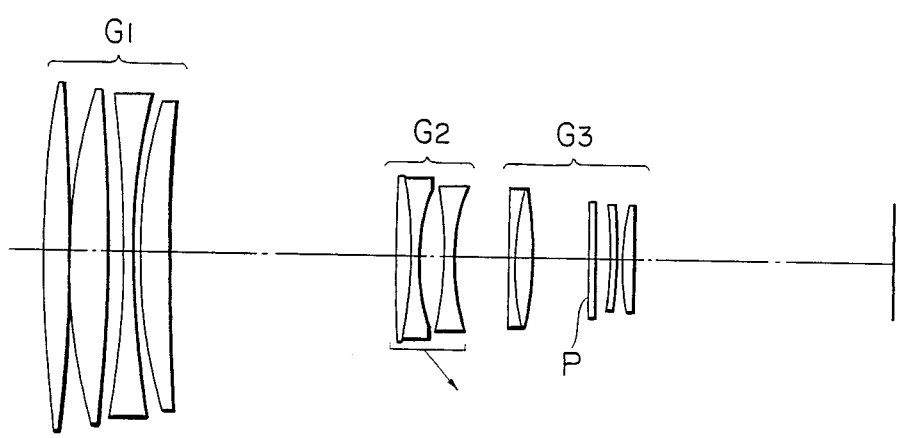
Figure 7A:
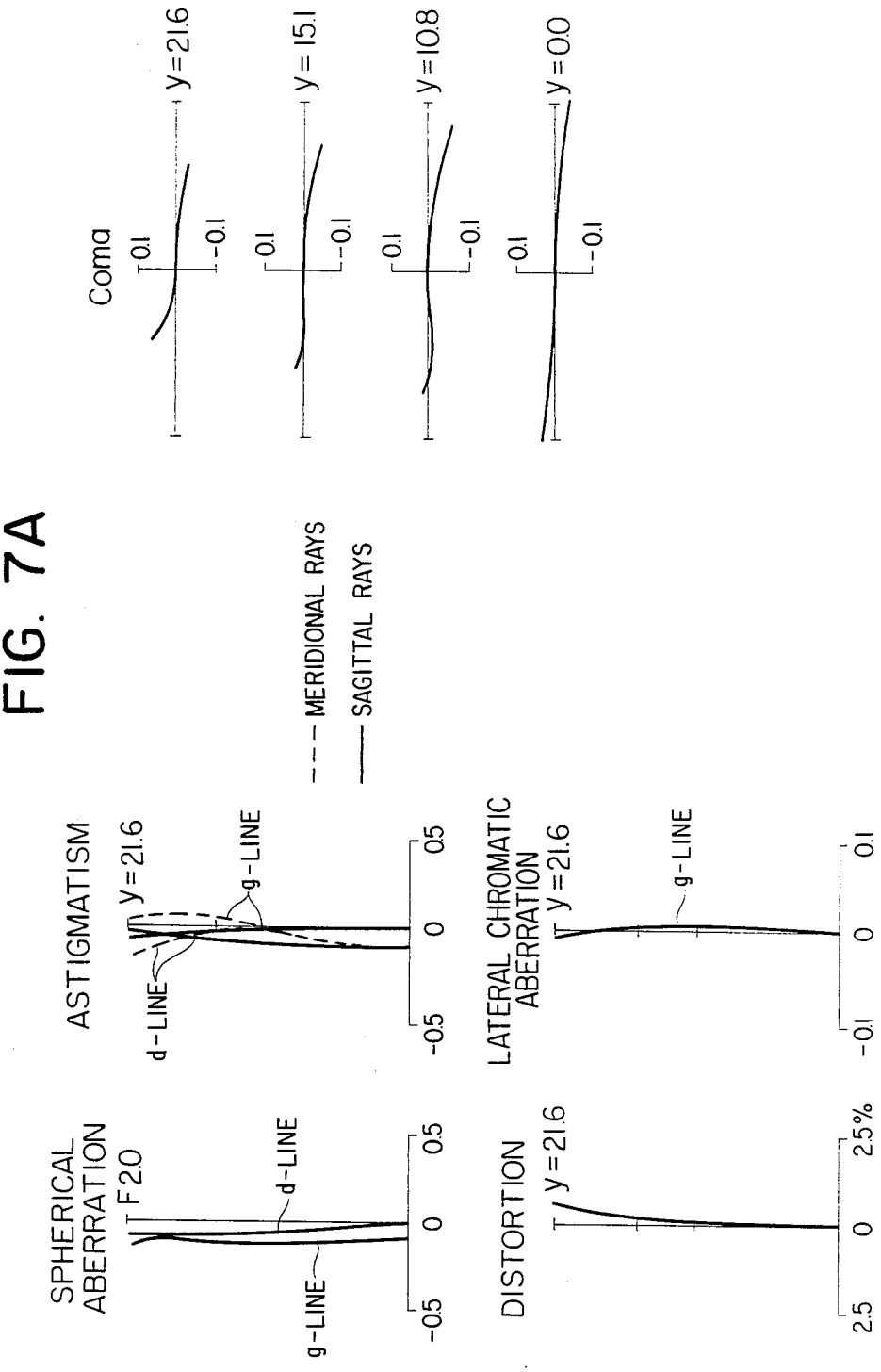
Figure 7B:
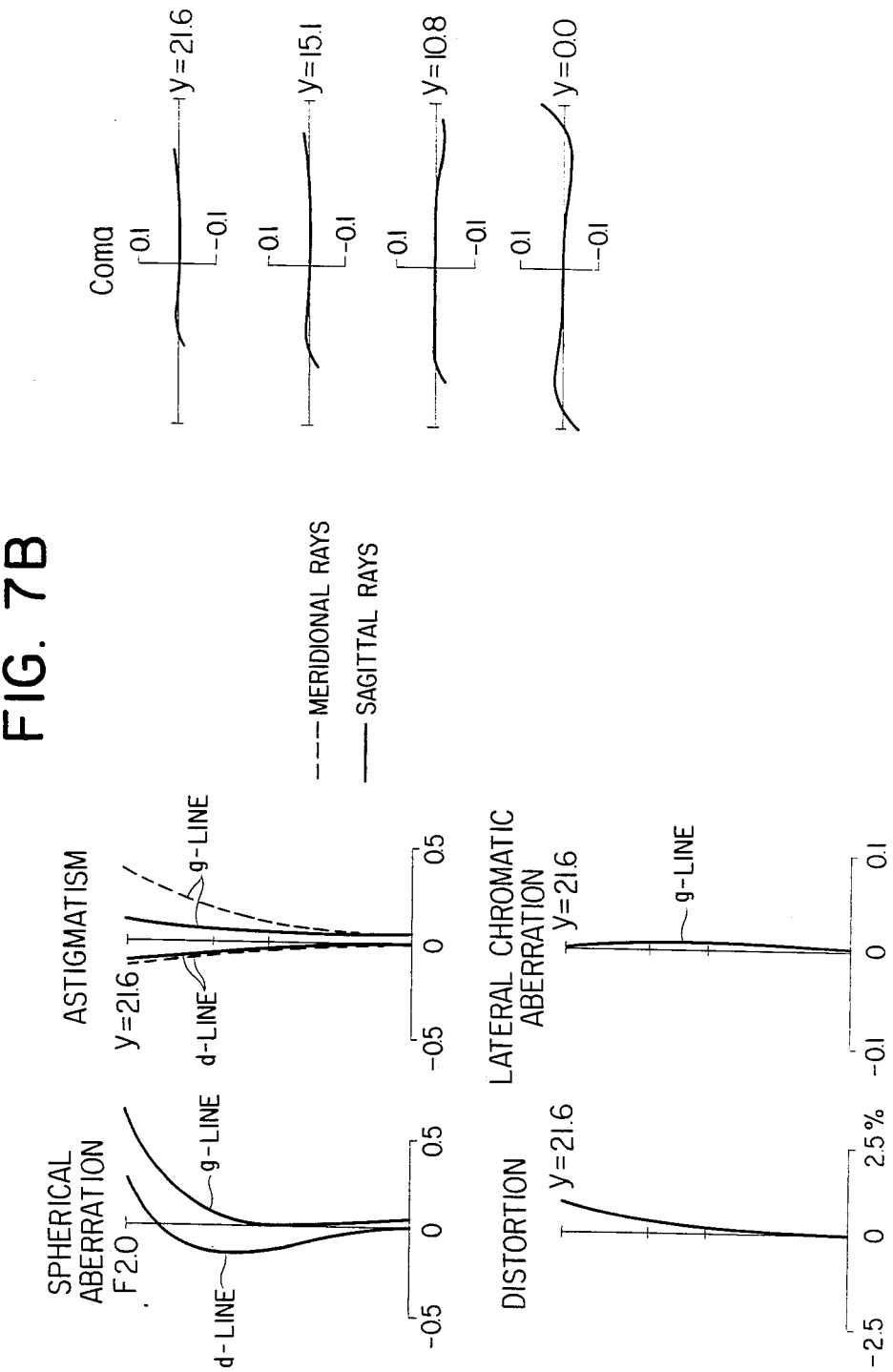
Figure 8B:
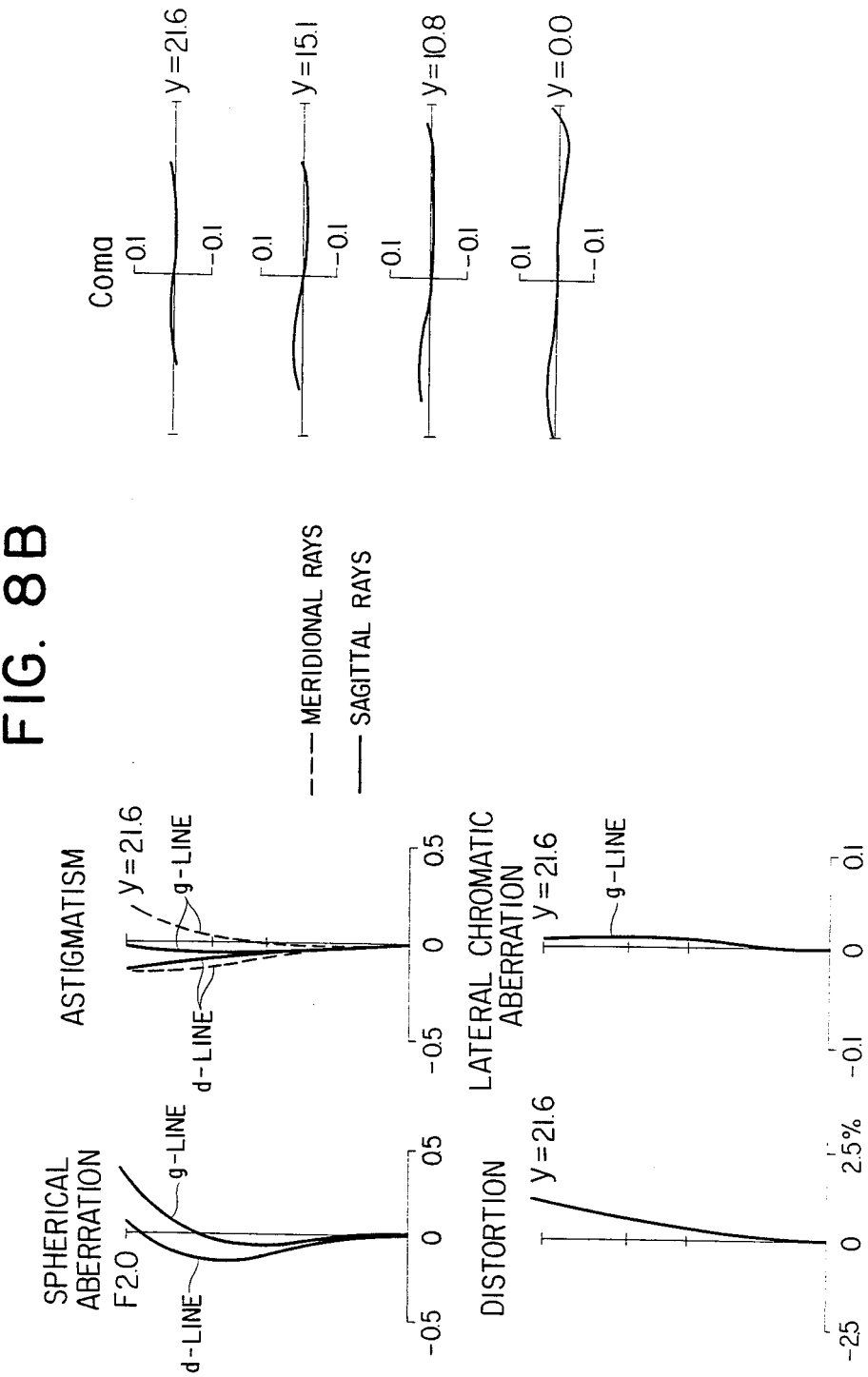
Figure 9A:
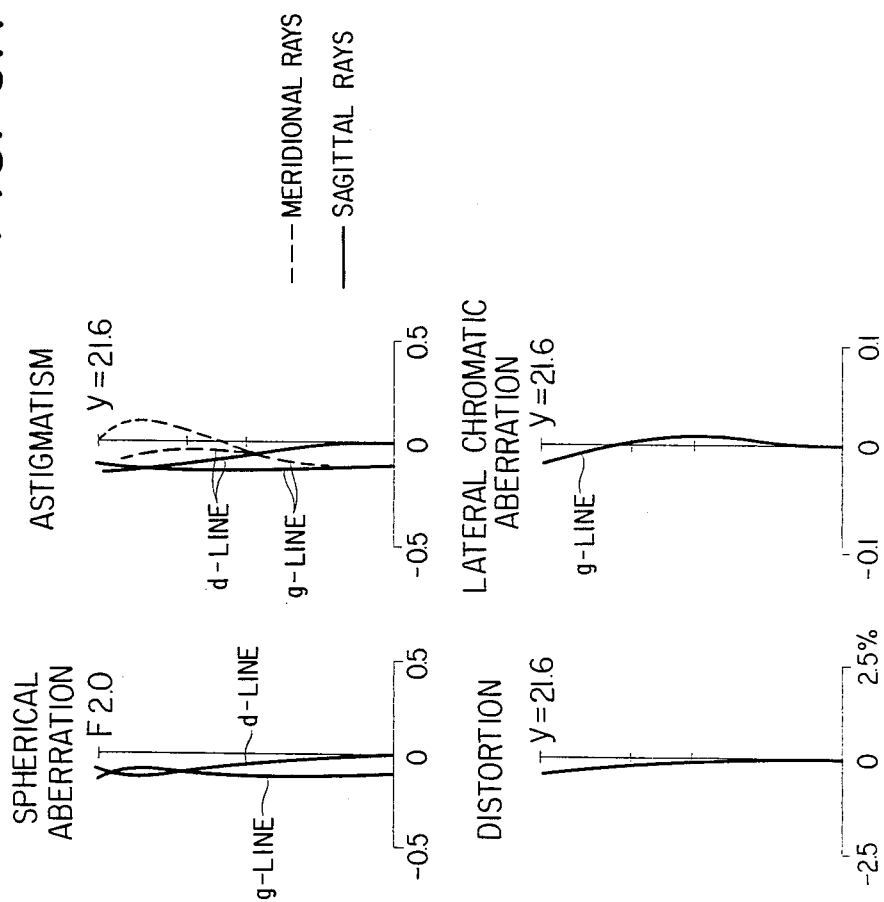
Figure 9B:
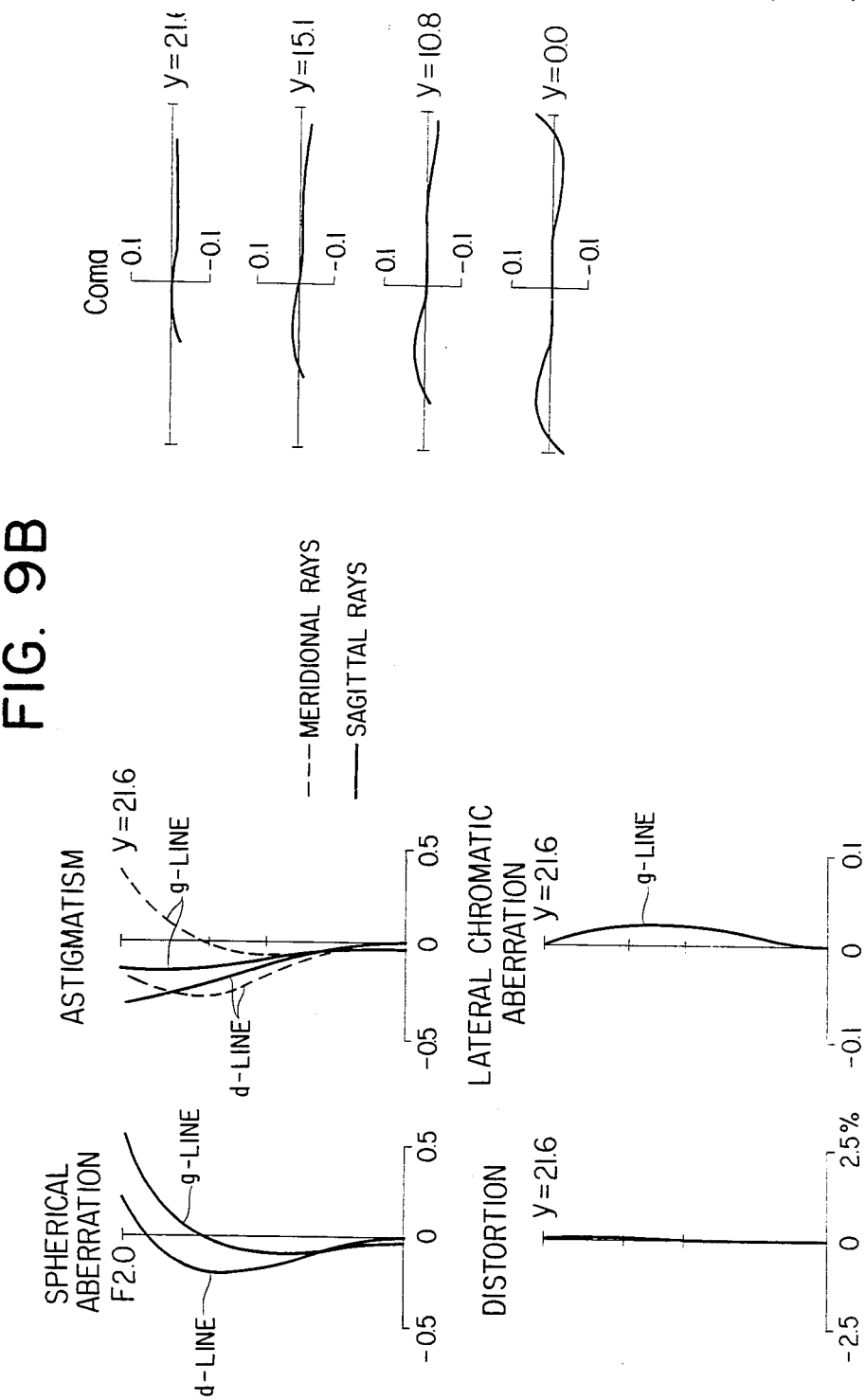
Figure 10A:
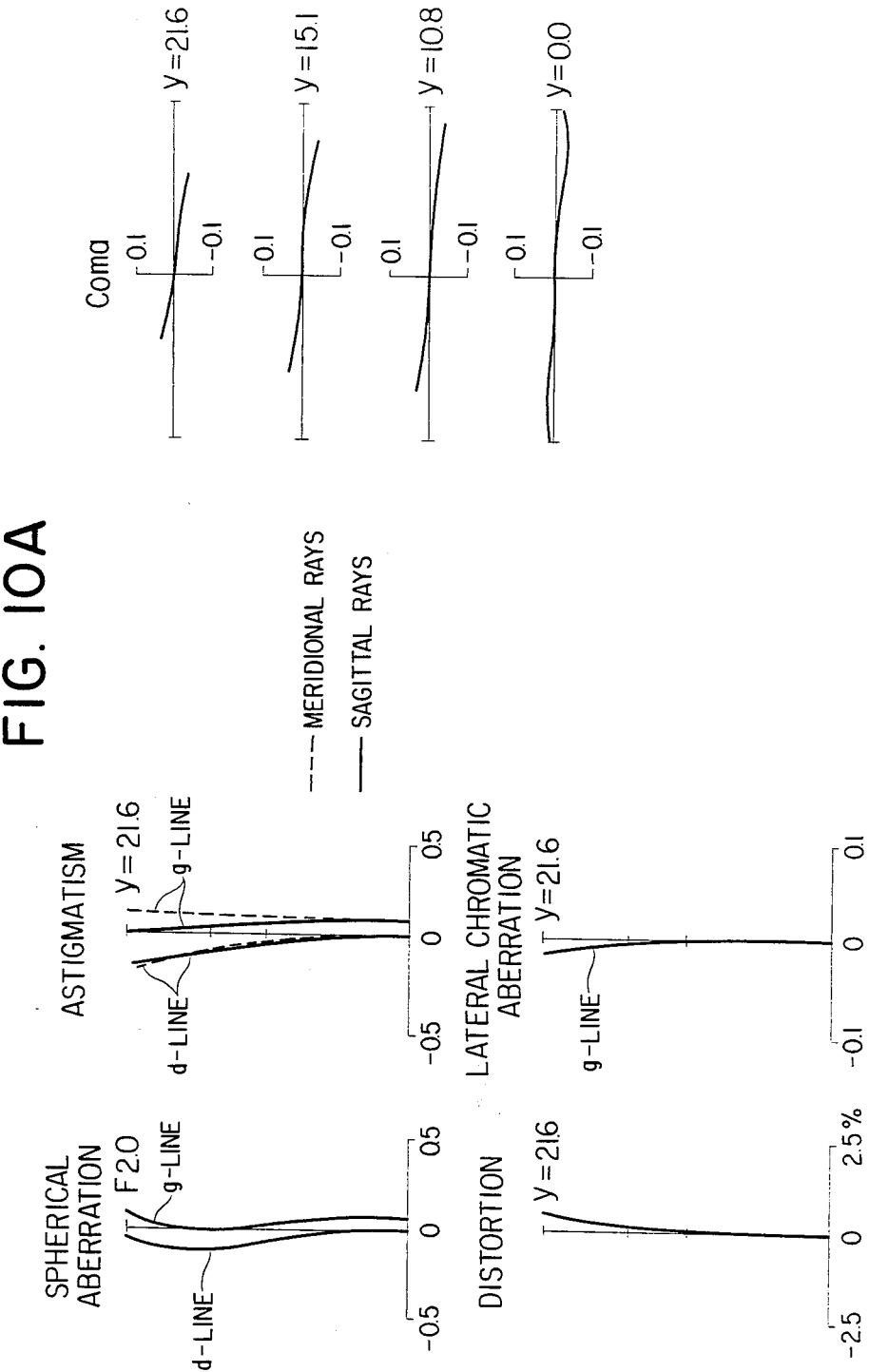
Figure 11B:
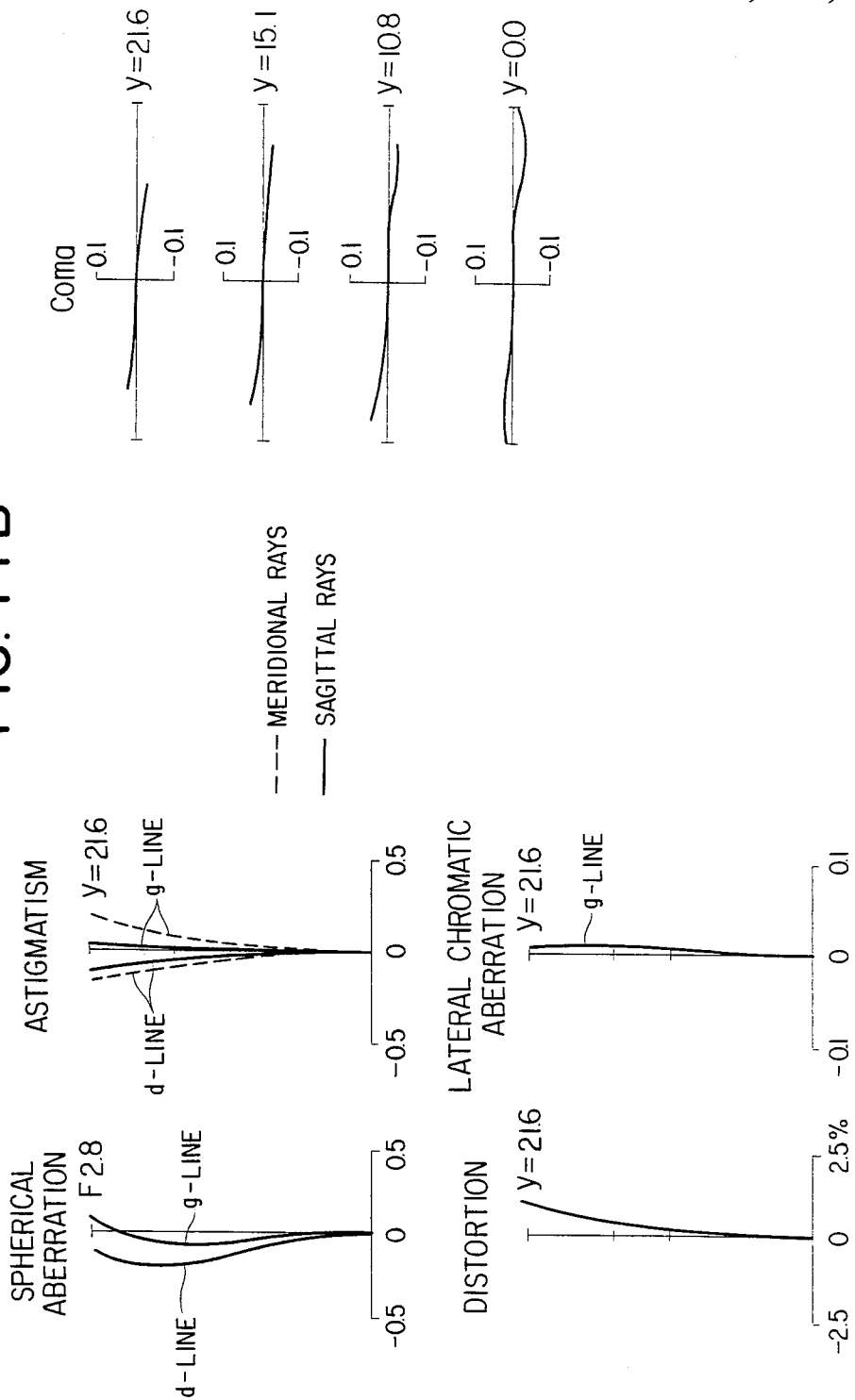
Figure 12A:
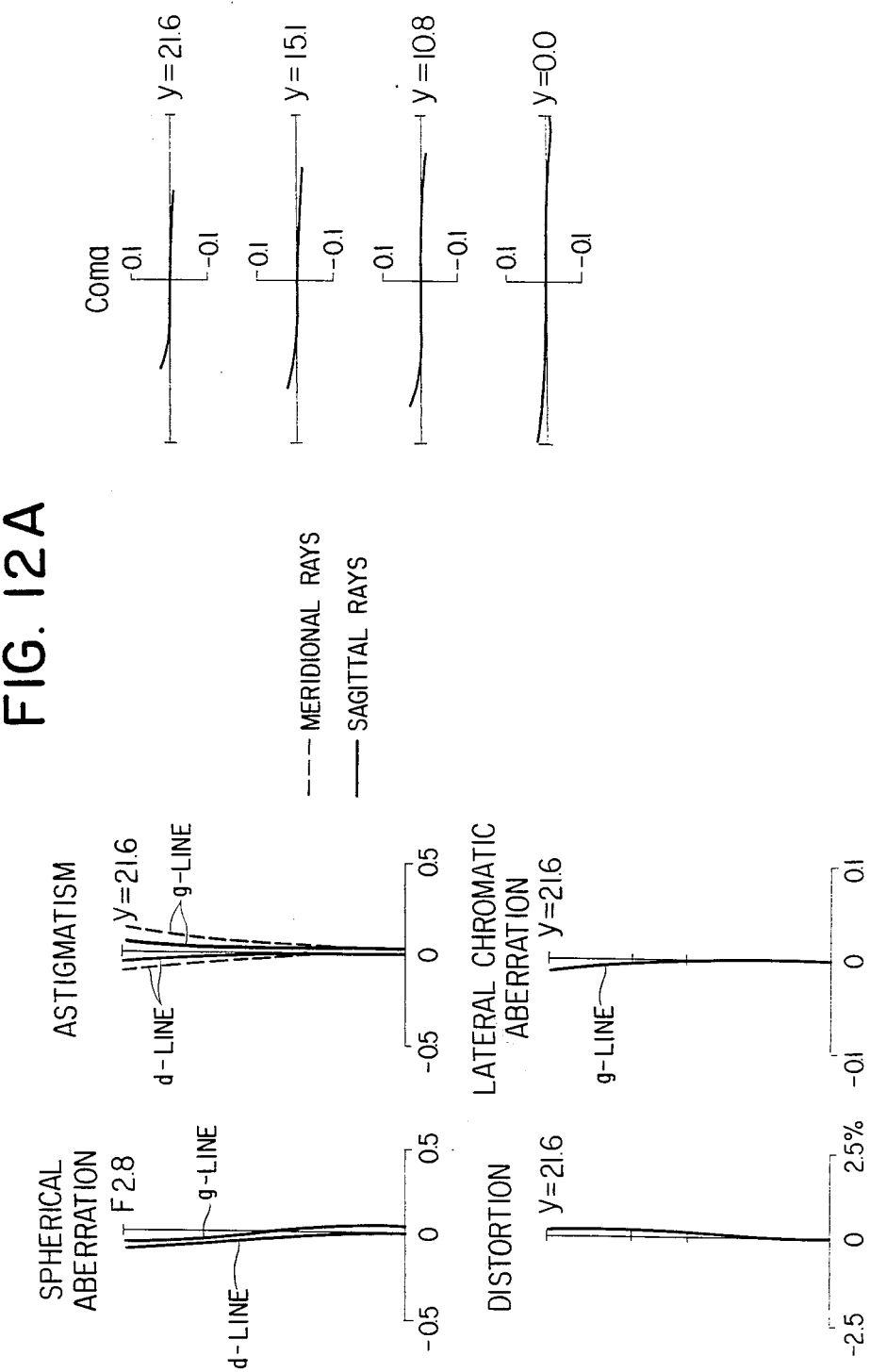

The arrangement of the lens components shown in FIG. 6 is substantially the same as that in FIG. 5.

According to the present invention, it was found that a lens system must be prepared to satisfy conditions (1) to (3) below so as to obtain a fast high-performance telephoto lens having a focal length of 300 to 400 mm and an F-number of 2.0 to 2.8.

$$0.7f \leq f1 < f \tag{1}$$

$$0.12f \leq f2 \leq 0.48f \tag{2}$$

$$-1.50 \leq (rb+ra)/(rb-ra) \leq -0.50 \tag{3}$$

where
f: the focal length of the entire optical system
f1: the focal length of the first converging lens group
f2: the focal length of the diverging lens group
ra: the radius of curvature of a surface of the negative lens component in the diverging lens group that is located nearer the object, the surface being that closest to the object
rb: the radius of curvature of a surface of the negative lens component in the diverging lens group that is located nearer the object, the surface being that closest to the image Condition (1) defines the range of focal length of the first converging lens group with respect to the focal length of the entire lens system. The focal length of the first converging lens group is the most important factor for correcting spherical aberration so as to obtain a fast telephoto lens. When the first converging lens group comprises three or four lenses, the range given by condition (1) is optimal. When the focal length of the first converging lens group G1 falls below the lower limit of the range given by condition (1), it is very difficult to correct the spherical aberration with the first converging lens group, resulting in a high-order curvature. In this case, correction cannot be performed to obtain a focal depth corresponding to the F-number of 2.0 to 2.8. In addition, a lens system constituted by the diverging lens group G2 and the second converging lens group G3 must magnify an image with a larger magnification factor. As a result, the secondary spectrum is increased. On the other hand, when the focal length exceeds the upper limit of the range given by condition (1), it is easy to correct the spherical aberration. However, the overall length of the telephoto lens is increased. In addition to this disadvantage, a shift distance of the diverging lens group for an in-focus state becomes longer than that of an extension type lens, resulting in inconvenience.

Condition (2) defines the optimal range of focal length of the diverging lens groups with respect to the overall focal length of the entire system. This condition is an important factor for correcting spherical aberration, astigmatism and coma, especially astigmatism. According to the lens system of the present invention, the first converging lens group and the diverging lens group constitute an afocal system for an object at infinity. Therefore, condition (2) determines a position of the diverging lens group G2 relative to the first converging lens group G1. When the focal length of the diverging lens group G2 falls below the lower limit of the range given by condition (2), the diverging lens group G2 is shifted toward the image from the first converging lens group G1. When the diaphragm position is located near the second converging lens group G3, the diverging lens group G2 receives the main light rays near the optical axis. As a result, the astigmatism generated by the first converging lens group G1 can no longer be corrected. At the same time, an asymmetrical component in coma is also increased, so a negative spherical aberration generated by the first converging lens group G1 can no longer be corrected, resulting in a great negative spherical aberration. However, when the focal length of the diverging lens group G2 exceeds the upper limit of the range given by condition (2), the diverging lens group G2 is located in the vicinity of the first converging lens group G1. A diameter of the diaphragm positioned in the vicinity of the second converging lens group G3 is increased, and a diaphragm mechanism is complicated. As a result, an automatic diaphragm cannot be employed.

Condition (3) is an optimal factor for correcting the spherical aberration so as to achieve a high-performance lens system under conditions (1) and (2). In order to obtain a telephoto lens having a focal length of 300 to 400 mm and an F-number of 2.0 to 2.8, the focal depth falls within the range between about 0.06 and 0.09. A deviation in spherical aberration must be minimized. The component of the diverging lens group which is located near the object contributes most to the correction of spherical aberration. Therefore, the shape of lenses of the component described above is very important. When the ratio $(rb+ra)/(rb-ra)$ exceeds the upper limit of the range given by condition (3), an annular spherical aberration is increased, and thus the spherical aberration is excessively corrected. However, when the ratio falls below the lower limit of the range given by condition (3), the aberration correction is insufficient. In addition, when the ratio falls outside the range, the asymmetrical component in coma is also increased.

In the fundamental arrangement of the telephoto lens according to the present invention, preferable conditions for providing a higher-performance lens system are derived as follows.

For the first converging lens group, $$0.01 < d4/f1 < 0.09 \tag{4}$$

where
d4: the second space in the first converging lens group G1

Condition (4) is used for coma correction. Oblique rays passing through a lens portion away from the optical axis thereof are strongly converged at a surface (at the image side) of the second positive lens of the first converging lens group G1 which is counted from the object. The divergence degree for the strongly converged light rays strongly diverged by a surface of the negative lens (disposed immediately after the positive lens) which opposes the image is controlled by the space between the positive and negative lenses. As a result, coma is corrected.

When the ratio d4/f1 falls outside the range given by condition (4), an asymmetrical component in coma occurs, and proper coma correction cannot be performed. The above-mentioned surfaces of the positive and negative lenses also perform chromatic aberration. When the ratio d4/f1 exceeds the upper limit of the range given by the condition (4), achromatic correction cannot be performed.

In the diverging lens group G2, the negative lens component near the object preferably serves as the achromatic component so as to satisfy the following conditions.

$$0.1 < na - nb < 0.35 \tag{5}$$

$$18 < \nu b - \nu a \quad (6)$$

$$-0.5 < (rd+rc)/(rd-rc) < 0 \quad (7)$$

where
- na: the refractive index with respect to the d-line of the positive lens of the achromatic component (of the diverging lens group G2) located near the object
- nb: the refractive index with respect to the d-line of the negative lens of the achromatic component (of the diverging lens group G2) located near the object
- $\nu a$: the Abbe number of the positive lens of the achromatic component (of the diverging lens group G2) located near the object
- $\nu b$: the Abbe number of the negative lens of the achromatic component (of the diverging lens group G2) located near the object
- rc: the radius of curvature of a surface of the negative lens component in the diverging lens group G2 that is located nearer the image, the surface being that nearest the object
- rd: the radius of curvature of a surface of the negative lens component in the diverging lens group G2 that is located nearer the image, the surface being that nearest the image Conditions (5) and (6) are important to correct the chromatic aberration as well as the spherical aberration. Condition (5) provides a difference between refractive indices of the positive and negative lenses, so that the converging behavior of the achromatic surface changes. Condition (6) changes the radius of curvature of the achromatic surface, also resulting in a change in converging behavior of the achromatic surface. Therefore, conditions (5) and (6) determine an optimal power of an achromatic surface so as to correct the spherical aberration with respect to all wavelengths. When a value (na−nb) falls below the lower limit of the range given by condition (5), the power of the achromatic surface at the d-line becomes weak and does not contribute to correction of the spherical aberration for the d-line. In this case, a lens material (i.e., glass) having such a low value is not the best choice. However, when the value (na−nb) exceeds the upper limit of the range given by condition (5), the converging power of the achromatic surface and then the spherical aberration are increased, and the aberration correction is insufficient. When a value (→b−νa) falls below the lower limit of the range given by condition (6) in the same manner as in condition (5), the radius of curvature of the achromatic aberration and then the converging power of the converging lens group are too large to correct the chromatic aberration on the axis and the chromatic aberration of the magnification. Therefore, the spherical aberration correction becomes insufficient, resulting in inconvenience. The upper limit of the value ($\nu b - \nu a$) is determined by a commercially available glass material and is set to be about 70.

Condition (7) is associated with correction of close distance variations in spherical aberration and astigmatism. When a ratio (rd+rc)/(rd−rc) exceeds the upper limit of the range given by condition (7), the spherical aberration becomes greatly positive, and the image surface is positively curved. A difference between the infinity astigmatism and the closest distance astigmatism is increased, resulting in inconvenience. However, when the ratio (rd+rc)/(rd−rc) falls below the lower limit of the range given by condition (7), the spherical aberration becomes greatly negative, and the image surface is negatively curved. As a result, the difference between the infinity aberration and the closest distance aberration is increased, resulting in inconvenience.

As described above in detail, according to the present invention, a simple three-group type internal focusing telephoto lens is used to constitute a fast telephoto lens.

The present invention is not limited to the first to sixth embodiments described above. In each of the first to sixth embodiments, the first converging lens group G1 comprises two positive lens components and one negative lens component which are sequentially arranged from the object side. However, a positive lens component may be added to give four lenses in the first converging lens group so as to shorten the overall length thereof. When a 300-mm telephoto lens is provided, one or two achromatic components are preferably used. When a 400-mm telephoto lens is provided, a negative lens and a positive lens are added to each achromatic component, thereby properly correcting astigmatism and distortion.

The specifications of the respective telephoto lenses according to the first to sixth embodiments are listed below. In the following tables, reference symbols r1, r2, r3, ... are radii of curvature, respectively; d1, d2, d3, . . ., thicknesses at the centers of the respective lenses and lens distances, respectively; n1, n2, n3, . . . , refractive indices of the respective lenses with respect to the d-line ($\lambda = 587.6$ nm), respectively; and $\nu 1, \nu 2, \nu 3, \ldots$, the Abbe numbers of the respective lenses, respectively.

| First embodiment | f = 300 | F-number | 2.0 | |
|---|---|---|---|---|
| r1=213.382 | d1=23.000 | n1=1.49782 | $\nu1$=82.3 | |
| r2=−738.293 | d2=0.300 | | | |
| r3=168.324 | d3=23.000 | n2=1.49782 | $\nu2$=82.3 | |
| r4=−848.097 | d4=8.200 | | | G1 |
| r5=−531.204 | d5=8.100 | n3=1.75692 | $\nu3$=31.7 | |
| r6=41.072 | d6=91.540 | | | |
| r7=−7864.019 | d7=7.900 | n4=1.79886 | $\nu4$=34.1 | |
| r8=−105.904 | d8=3.000 | n5=1.51454 | $\nu5$=54.6 | |
| r9=193.539 | d9=10.450 | | | G2 |
| r10=−114.709 | d10=3.950 | n6=1 46450 | $\nu6$=65.8 | |
| r11=86.161 | d11=31.231 | | | |
| r12=376.118 | d12=1.500 | n7=1.68893 | $\nu7$=31.1 | |
| r13=100.0 | d13=7.000 | n8=1.69350 | $\nu8$=53.8 | |
| r14=−1707.134 | d14=2.000 | | | |
| r15=224.029 | d15=2.350 | n9=1.69895 | $\nu9$=30.1 | G3 |
| r16=130.0 | d16=8.500 | n10=1.69680 | $\nu10$=55.6 | |
| r17=−205.257 | | | | |
| Bf=111.055 | | | | |

| Second embodiment | f = 300 | F-number | 2.0 | |
|---|---|---|---|---|
| r1=396.963 | d1=15.00 | n1=1.62041 | $\nu1$=60.3 | |
| r2=−856.209 | d2=0.400 | | | |
| r3=169.663 | d3=25.00 | n2=1.49782 | $\nu2$=82.3 | |
| r4=−848.700 | d4=2.350 | | | |
| r5=−708.000 | d5=5.000 | n3=1.75692 | $\nu3$=31.7 | G1 |
| r6=295.194 | d6=1.400 | | | |
| r7=171.269 | d7=16.000 | n4=1.49782 | $\nu4$=82.3 | |
| r8=686.191 | d8=78.913 | | | |
| r9=1756.745 | d9=10.000 | n5=1.79504 | $\nu5$=28.6 | |
| r10=−140.240 | d10=3.000 | n6=1.51454 | $\nu6$=54.6 | |
| r11=138.770 | d11=9.626 | | | G2 |
| r12=−165.595 | d12=3.950 | n7=1.58913 | $\nu7$=61.2 | |
| r13=87.786 | d13=23.602 | | | |
| r14=628.332 | d14=1.500 | n8=1.68893 | $\nu8$=31.1 | |
| r15=130.000 | d15=7.000 | n9=1.69350 | $\nu9$=53.8 | |
| r16=−727.144 | d16=2.000 | | | G3 |
| r17=254.899 | d17=2.350 | n10=1.69895 | $\nu10$=30.1 | |
| r18=127.000 | d18=8.500 | n11=1.69680 | $\nu11$=55.6 | |
| r19=−169.604 | Bf=110.073 | | | |

| Third embodiment | f = 300 | F-number | 2.0 | |
|---|---|---|---|---|
| r1=196.956 | d1=23.000 | n1=1.49782 | $\nu1$=82.3 | |
| r2=−1307.161 | d2=0.300 | | | |
| r3=195.829 | d3=23.000 | n2=1.49782 | $\nu2$=82.3 | |

-continued

| | | | | |
|---|---|---|---|---|
| r4=−516.352 | d4=9.035 | | | G1 |
| r5=−380.362 | d5=8.100 | n3=1.75692 | ν3=31.7 | |
| r6=721.299 | d6=94.902 | | | |
| r7=−2258.410 | d7=10.000 | n4=1.79886 | ν4=34.0 | |
| r8=−117.177 | d8=2.000 | | | |
| r9=−101.703 | d9=3.000 | n5=1.46450 | ν5=65.8 | |
| r10=148.618 | d10=20.495 | | | G2 |
| r11=−95.192 | d11=5.000 | n6=1.69350 | ν6=53.8 | |
| r12=−61.177 | d12=3.950 | n7=1.51118 | ν7=50.9 | |
| r13=93.433 | d13=24.547 | | | |
| r14=98.544 | d14=10.000 | n8=1.62041 | ν8=60.3 | |
| r15=−121.912 | d15=3.300 | | | |
| r16=−261.503 | d16=5.000 | n9=1.62041 | ν9=60.3 | |
| r17=−102.467 | d17=3.000 | | | |
| r18=−92.976 | d18=3.000 | n10=1.75520 | ν10=27.6 | G3 |
| r19=−511.672 | d19=8.000 | | | |
| r20=−70.661 | d20=3.000 | n11=1.80518 | ν11=25.4 | |
| r21=−94.501 | d21=0.090 | | | |
| r22=88.159 | d22=10.000 | n12=1.60342 | ν12=38.1 | |
| r23=−100.000 | d23=3.000 | n13=1.62041 | ν13=60.3 | |
| r24=357.774 | Bf=46.847 | | | |

Fourth embodiment   f = 300   F-number   2.0

| | | | | |
|---|---|---|---|---|
| r1=443.373 | d1=14.500 | n1=1.49782 | ν1=82.3 | |
| r2=−745.663 | d2=0.500 | | | |
| r3=235.410 | d3=21.000 | n2=1.49782 | ν2=82.3 | |
| r4=−599.816 | d4=6.850 | | | G1 |
| r5=−527.848 | d5=6.000 | n3=1.74950 | ν3=35.2 | |
| r6=473.787 | d6=1.700 | | | |
| r7=176.900 | d7=15.000 | n4=1.49782 | ν4=82.3 | |
| r8=558.189 | d8=102.701 | | | |
| r9=749.672 | d9=8.000 | n5=1.79504 | ν5=28.6 | |
| r10=−189.496 | d10=3.650 | n6=1.51454 | ν6=54.6 | |
| r11=125.271 | d11=12.000 | | | G2 |
| r12=−148.765 | d12=4.800 | n7=1.46450 | ν7=65.8 | |
| r13=97.985 | d13=28.388 | | | |
| r14=−1754.216 | d14=1.500 | n8=1.68893 | ν8=31.1 | |
| r15=110.000 | d15=7.750 | n9=1.69350 | ν9=53.8 | |
| r16=−317.940 | d16=2.000 | | | |
| r17=169.454 | d17=2.400 | n10=1.69895 | ν10=30.1 | G3 |
| r18=113.525 | d18=8.000 | n11=1.69680 | ν11=55.6 | |
| r19=−254.060 | Bf=112.223 | | | |

Fifth embodiment   f = 400   F-number   2.8

| | | | | |
|---|---|---|---|---|
| r1=366.543 | d1=15.000 | n1=1.49782 | ν1=82.3 | |
| r2=−644.512 | d2=.000 | | | |
| r3=213.552 | d3=21.000 | n2=1.49782 | ν2=82.3 | |
| r4=−441.810 | d4=5.000 | | | G1 |
| r5=−394.853 | d5=4.800 | n3=1.74950 | ν3=35.2 | |
| r6=432.180 | d6=1.300 | | | |
| r7=156.381 | d7=14.000 | n4=1.49782 | ν4=82.3 | |
| r8=1095.641 | d8=86.847 | | | |
| r9=−46400.000 | d9=7.000 | n5=1.78470 | ν5=26.1 | |
| r10=−139.436 | d10=2.500 | n6=1.65160 | ν6=58.5 | |
| r11=128.330 | d11=10.000 | | | G2 |
| r12=−172.383 | d12=3.500 | n7=1.51680 | ν7=64.1 | |
| r13=104.035 | d13=18.449 | | | |
| r14=487.163 | d14=1.500 | n8=1.67163 | ν8=38.9 | |
| r15=98.542 | d15=10.000 | n9=1.59319 | ν9=67.9 | |
| r16=−100.861 | d16=25.500 | | | |
| r17=∞ | d17=2.000 | n10=1.51680 | ν10=64.1 | |
| r18=∞ | d18=7.700 | | | G3 |
| r19=−161.289 | d19=2.800 | n11=1.78797 | ν11=47.5 | |
| r20=−458.625 | d20=1.000 | | | |
| r21=609.162 | d21=5.700 | n12=1.53172 | ν12=49.1 | |
| r22=−191.968 | Bf=111.255 | | | |

Sixth embodiment   f = 400   F-number   2.8

| | | | | |
|---|---|---|---|---|
| r1=404.620 | d1=12.400 | n1=1.49782 | ν1=82.3 | |
| r2=−739.128 | d2=.500 | | | |
| r3=229.061 | d3=19.000 | n2=1.49782 | ν2=82.3 | |
| r4=−576.364 | d4=6.500 | | | G1 |
| r5=−504.589 | d5=5.700 | n3=1.74950 | ν3=35.2 | |
| r6=450.293 | d6=1.600 | | | |
| r7=174.251 | d7=14.300 | n4=1.49782 | ν4=82.3 | |
| r8=610.132 | d8=102.683 | | | |
| r9=774.302 | d9=7.500 | n5=1.79504 | ν5=28.6 | |
| r10=−170.747 | d10=3.400 | n6=1.51454 | ν6=54.6 | |
| r11=112.007 | d11=11.200 | | | G2 |
| r12=−135.143 | d12=4.500 | n7=1.46450 | ν7=65.8 | |
| r13=98.477 | d13=25.175 | | | |
| r14=537.096 | d14=1.500 | n8=1.67163 | ν8=38.9 | |

-continued

| | | | | |
|---|---|---|---|---|
| r15=109.866 | d15=9.700 | n9=1.59319 | ν9=67.9 | |
| r16=−106.723 | d16=26.000 | | | |
| r17=∞ | d17=2.000 | n10=1.51680 | ν10=64.1 | |
| r18=∞ | d18=7.800 | | | G3 |
| r19=−180.104 | d19=2.900 | n11=1.79631 | ν11=41.0 | |
| r20=−975.725 | d20=1.000 | | | |
| r21=119.226 | d21=5.800 | n12=1.53172 | ν12=49.1 | |
| r22=3284.360 | Bf=113.852 | | | |

In the first embodiment, f1/f=0.90 and f2/f=0.35. When the diverging lens group G2 is shifted by 21.0 toward the image, closest distance photography with the magnification factor $\beta = -0.086$ can be performed.

In the second embodiment, f1/f=0.75 and f2/f=0.29. When the diverging lens group G2 is shifted by 16.8 toward the image, closest distance photography with the magnification factor $\beta = -0.100$ can be performed.

In the third embodiment, f1/f=0.75 and f2/f=0.35. When the diverging lens group G2 is shifted by 21.0 toward the image, closest distance photography with the magnification factor $\beta = -0.086$ can be performed.

In the fourth embodiment, f1/f=0.90 and f2/f=0.35. When the diverging lens group G2 is shifted by 21.0 toward the image, closest distance photography with the magnification factor $\beta = -0.089$ can be performed.

In the fifth embodiment, f1/f=0.54 and f2/f=0.20. When the diverging lens group G2 is shifted by 13.5 toward the image, closest distance photography with the magnification factor $\beta = -0.116$ can be performed.

In the sixth embodiment, f1/f=0.65 and f2/f=0.25. When the diverging lens group G2 is shifted by 19.8 toward the image, closest distance photography with the magnification factor $\beta = -0.118$ can be performed.

It should be noted that filters P are inserted in the second converging lens groups G3 in the fifth and sixth embodiments, respectively.

The various aberrations of the respective embodiments are shown in FIGS. 7A and 7B to FIGS. 12A to 12B. The aberrations of each embodiment include spherical aberration (Sph), astigmatism (Ast), distortion (Dis), lateral chromatic aberration (Lat Chr) of the g-line ($\lambda$=435.8 nm) with respect to the d-line ($\lambda$=587.6 nm), and coma (Coma). FIGS. 7A to 12A show the various aberrations in the infinity in-focus state according to the first to sixth embodiments, and FIGS. 7B to 12B show the various aberrations in the closest distance in-focus state according to the first to sixth embodiments.

The fast telephoto lenses according to the respective embodiments have an excellent imaging performance irrespective of infinity or closest distance image magnification. It is thus apparent that the deviations in aberrations in the in-focus state are properly corrected.

I claim:

1. A fast telephoto lens, which has an F-number of approximately 2.0 to 2.8, consisting of:
    a first converging lens group;
    a diverging lens group; and
    a second converging lens group;
    said first converging lens group, said diverging lens group and said second converging lens group being arranged in succession from the object side, said first converging lens group and said diverging lens group being arranged to constitute an afocal system with respect to an object at infinity, said diverging lens group being shifted toward an image so as to focus said fast telephoto lens on a close distance object, said first converging lens group including at least two positive lens components and one negative lens component which are sequentially arranged from the object side, said diverging lens group including two negative lens components at least one of which consists of an achromatic lens component constituted by a positive lens and a negative lens, said second converging lens group including at least one achromatic lens component constituted by a negative lens and a positive lens, and said fast telephoto lens satisfying conditions below:

$$0.7f \leq f_1 < f$$

$$-0.5 < (rd+rc)/(rd-rc) < 0$$

where f: overall focal length of said fast telephoto lens
$f_1$: focal length of said first converging lens group
rc: radius of curvature of a surface of the negative lens component of said diverging lens group that is located nearer the image, the surface being that closest to the object
rd: radius of curvature of a surface of the negative lens component of said diverging lens group that is located nearer the image, the surface being that closest to the image.

2. A fast telephoto lens according to claim 1, wherein said fast telephoto lens further satisfies conditions below:

$$0.12f \leq f_2 \leq 0.48f$$

$$-1.50 \leq (rb+ra)/(rb-ra) \leq -0.50$$

$$0.01 < d_4/f_1 < 0.09$$

$$0.1 < na - nb < 0.35$$

$$18 < vb - va$$

where $f_2$: focal lenth of said diverging lens group
ra: radius of curvature of a surface of the negative lens component of said diverging lens group that is located nearer the object, the surface being that closest to the object
rb: radius of curvature of a surface of the negative lens component of said diverging lens group that is located nearer the object, the surface being that closest to the image
$d_4$: a second space in said first converging lens group
na: refractive index of the positive lens of the achromatic component of said diverging lens group, the positive lens being located near the object
nb: refractive index of the negative lens of the achromatic component of said diverging lens group, the negative lens being located near the object
va: Abbe number of the positive lens of the achromatic component of said diverging lens group, the positive lens being located near the object
vb: Abbe number of the negative lens of the achromatic component of said diverging lens group, the negative lens being located near the object.

3. A fast telephoto lens according to claim 1, characterized by the following data:

| f = 300 | F-number 2.0 | | | |
|---|---|---|---|---|
| r1=213.382 | d1=23.000 | n1=1.49782 | v1=82.3 | G1 |
| r2=−738.293 | d2=0.300 | | | |
| r3=168.324 | d3=23.000 | n2=1.49782 | v2=82.3 | |
| r4=−848.097 | d4=8.200 | | | |
| r5=−531.204 | d5=8.100 | n3=1.75692 | v3=31.7 | |
| r6=41.072 | d6=91.540 | | | |
| r7=−7864.019 | d7=7.900 | n4=1.79886 | v4=34.1 | G2 |
| r8=−105.904 | d8=3.000 | n5=1.51454 | v5=54.6 | |
| r9=193.539 | d9=10.450 | | | |
| r10=−114.709 | d10=3.950 | n6=1.46450 | v6=65.8 | |
| r11=86.161 | d11=31.231 | | | |
| r12=376.118 | d12=1.500 | n7=1.68893 | v7=31.1 | G3 |
| r13=100.0 | d13=7.000 | n8=1.69350 | v8=53.8 | |
| r14=−1707.134 | d14=2.000 | | | |
| r15=224.029 | d15=2.350 | n9=1.69895 | v9=30.1 | |
| r16=130.0 | d16=8.500 | n10=1.69680 | v10=55.6 | |
| r17=−205.257 | | | | |
| Bf=111.055 | | | | | where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; v1, v2, v3, ... are the Abbe numbers of respective lenses in order from the object side; and Bf is the back focal length of the telephoto lens.

4. A fast telephoto lens according to claim 1, characterized by the following data:

| f = 300 | F-number 2.0 | | | |
|---|---|---|---|---|
| r1=396.963 | d1=15.00 | n1=1.62041 | v1=60.3 | G1 |
| r2=−856.209 | d2=0.400 | | | |
| r3=169.663 | d3=25.00 | n2=1.49782 | v2=82.3 | |
| r4=−848.700 | d4=2.350 | | | |
| r5=−708.000 | d5=5.000 | n3=1.75692 | v3=31.7 | |
| r6=295.194 | d6=1.400 | | | |
| r7=171.269 | d7=16.000 | n4=1.49782 | v4=82.3 | |
| r8=686.191 | d8=78.913 | | | |
| r9=1756.745 | d9=10.000 | n5=1.79504 | v5=28.6 | G2 |
| r10=−140.240 | d10=3.000 | n6=1.51454 | v6=54.6 | |
| r11=138.770 | d11=9.626 | | | |
| r12=−165.595 | d12=3.950 | n7=1.58913 | v7=61.2 | |
| r13=87.786 | d13=23.602 | | | |
| r14=628.332 | d14=1.500 | n8=1.68893 | v8=31.1 | G3 |
| r15=130.000 | d15=7.000 | n9=1.69350 | v9=53.8 | |
| r16=−727.144 | d16=2.000 | | | |
| r17=254.899 | d17=2.350 | n10=1.69895 | v10=30.1 | |
| r18=127.000 | d18=8.500 | n11=1.69680 | v11=55.6 | |
| r19=−169.604 | Bf=110.073 | | | | where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; v1, v2, v3, ... are the Abbe numbers of respective lenses in order from the object side; and Bf is the back focal length of the telephoto lens.

5. A fast telephoto lens according to claim 1, characterized by the following data:

| f = 300 | F-number 2.0 | | | |
|---|---|---|---|---|
| r1=196.956 | d1=23.000 | n1=1.49782 | v1=82.3 | G1 |
| r2=−1307.161 | d2=0.300 | | | |
| r3=195.829 | d3=23.000 | n2=1.49782 | v2=82.3 | |
| r4=−516.352 | d4=9.035 | | | |
| r5=−380.362 | d5=8.100 | n3=1.75692 | v3=31.7 | |

-continued

| f = 300 | F-number 2.0 | | |
|---|---|---|---|
| r6=721.299 | d6=94.902 | | |
| r7=−2258.410 | d7=10.000 | n4=1.79886 | ν4=34.0 |
| r8=−117.177 | d8=2.000 | | |
| r9=−101.703 | d9=3.000 | n5=1.46450 | ν5=65.8 |
| r10=148.618 | d10=20.495 | | |
| r11=−95.192 | d11=5.000 | n6=1.69350 | ν6=53.8 |
| r12=−61.177 | d12=3.950 | n7=1.51118 | ν7=50.9 |
| r13=93.433 | d13=24.547 | | |
| r14=98.544 | d14=10.000 | n8=1.62041 | ν8=60.3 |
| r15=−121.912 | d15=3.300 | | |
| r16=−261.503 | d16=5.000 | n9=1.62041 | ν9=60.3 |
| r17=−102.467 | d17=3.000 | | |
| r18=−92.976 | d18=3.000 | n10=1.75520 | ν10=27.6 |
| r19=−511.672 | d19=8.000 | | |
| r20=−70.661 | d20=3.000 | n11=1.80518 | ν11=25.4 |
| r21=−94.501 | d21=0.090 | | |
| r22=88.159 | d22=10.000 | n12=1.60342 | ν12=38.1 |
| r23=−100.000 | d23=3.000 | n13=1.62041 | ν13=60.3 |
| r24=357.774 | Bf=46.847 | | |

G2, G3 where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; ν1, ν2, ν3, ... are the Abbe numbers of respective lenses in order from the object side; and Bf is the back focal length of the telephoto lens.

6. A fast telephoto lens according to claim 1, characterized by the following data:

| f = 300 | F-number 2.0 | | |
|---|---|---|---|
| r1=443.373 | d1=14.500 | n1=1.49782 | ν1=82.3 |
| r2=−745.663 | d2=0.500 | | |
| r3=235.410 | d3=21.000 | n2=1.49782 | ν2=82.3 |
| r4=−599.816 | d4=6.850 | | |
| r5=−527.848 | d5=6.000 | n3=1.74950 | ν3=35.2 |
| r6=473.787 | d6=1.700 | | |
| r7=176.900 | d7=15.000 | n4=1.49782 | ν4=82.3 |
| r8=558.189 | d8=102.701 | | |
| r9=749.672 | d9=8.000 | n5=1.79504 | ν5=28.6 |
| r10=−189.496 | d10=3.650 | n6=1.51454 | ν6=54.6 |
| r11=125.271 | d11=12.000 | | |
| r12=−148.765 | d12=4.800 | n7=1.46450 | ν7=65.8 |
| r13=97.985 | d13=28.388 | | |
| r14=−1754.216 | d14=1.500 | n8=1.68893 | ν8=31.1 |
| r15=110.000 | d15=7.750 | n9=1.69350 | ν9=53.8 |
| r16=−317.940 | d16=2.000 | | |
| r17=169.454 | d17=2.400 | n10=1.69895 | ν10=30.1 |
| r18=113.525 | d18=8.000 | n11=1 69680 | ν11=55.6 |
| r19=−254.060 | Bf=112.223 | | |

G1, G2, G3 where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; ν1, ν2, ν3, ... are the Abbe numbers of respective lenses in order from the object side; and Bf is the back focal length of the telephoto lens.

7. A fast telephoto lens according to claim 1, characterized by the following data:

| f = 400 | F-number 2.8 | | |
|---|---|---|---|
| r1=366.543 | d1=15.000 | n1=1.49782 | ν1=82.3 |
| r2=−644.512 | d2=.000 | | |
| r3=213.552 | d3=21.000 | n2=1.49782 | ν2=82.3 |
| r4=−441.810 | d4=5.000 | | |
| r5=−394.853 | d5=4.800 | n3=1.74950 | ν3=35.2 |
| r6=432.180 | d6=1.300 | | |
| r7=156.381 | d7=14.000 | n4=1.49782 | ν4=82.3 |
| r8=1095.641 | d8=86.847 | | |
| r9=−46400.000 | d9=7.000 | n5=1.78470 | ν5=26.1 |
| r10=−139.436 | d10=2.500 | n6=1.65160 | ν6=58.5 |
| r11=128.330 | d11=10.000 | | |
| r12=−172.383 | d12=3.500 | n7=1.51680 | ν7=64.1 |
| r13=104.035 | d13=18.449 | | |
| r14=487.163 | d14=1.500 | n8=1.67163 | ν8=38.9 |
| r15=98.542 | d15=10.000 | n9=1.59319 | ν9=67.9 |
| r16=−100.861 | d16=25.500 | | |
| r17=∞ | d17=2.000 | n10=1.51680 | ν10=64.1 |
| r18=∞ | d18=7.700 | | |
| r19=−161.289 | d19=2.800 | n11=1.78797 | ν11=47.5 |
| r20=−458.625 | d20=1.000 | | |
| r21=609.162 | d21=5.700 | n12=1.53172 | ν12=49.1 |
| r22=−191.968 | Bf=111.255 | | |

G1, G2, G3 where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; ν1, ν2, ν3, ... are the Abbe numbers of respective lenses in order from the object side; and Bf is the back focal length of the telephoto lens.

8. A fast telephoto lens according to claim 1, characterized by the following data:

| f = 400 | F-number 2.8 | | |
|---|---|---|---|
| r1=404.620 | d1=12.400 | n1=1.49782 | ν1=82.3 |
| r2=−739.128 | d2=.500 | | |
| r3=229.061 | d3=19.000 | n2=1.49782 | ν2=82.3 |
| r4=−576.364 | d4=6.500 | | |
| r5=−504.589 | d5=5.700 | n3=1.74950 | ν3=35.2 |
| r6=450.293 | d6=1.600 | | |
| r7=174.251 | d7=14.300 | n4=1.49782 | ν4=82.3 |
| r8=610.132 | d8=102.683 | | |
| r9=774.302 | d9=7.500 | n5=1.79504 | ν5=28.6 |
| r10=−170.747 | d10=3.400 | n6=1.51454 | ν6=54.6 |
| r11=112.007 | d11=11.200 | | |
| r12=−135.143 | d12=4.500 | n7=1.46450 | ν7=65.8 |
| r13=98.477 | d13=25.175 | | |
| r14=537.096 | d14=1.500 | n8=1.67163 | ν8=38.9 |
| r15=109.866 | d15=9.700 | n9=1.59319 | ν9=67.9 |
| r16=−106.723 | d16=26.000 | | |
| r17=∞ | d17=2.000 | n10=1.51680 | ν10=64.1 |
| r18=∞ | d18=7.800 | | |
| r19=−180.104 | d19=2.900 | n11=1.79631 | ν11=41.0 |
| r20=−975.725 | d20=1.000 | | |
| r21=119.226 | d21=5.800 | n12=1.53172 | ν12=49.1 |
| r22=3284.360 | Bf=113.852 | | |

G1, G2, G3 where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; ν1, ν2, ν3, ... are the Abbe numbers of respective lenses in order from the object side; and Bf is the back focal length of the telephoto lens.

9. A fast telephoto lens, which has an F-number of approximately 2.0 to 2.8, comprising:
 a first converging lens group;
 a diverging lens group; and
 a second converging lens group;
  said first converging lens group, said diverging lens group and said second converging lens group being arranged in succession from the object side, said first converging lens group and said diverging lens group being arranged to constitute an afocal system with respect to an object at infinity, said diverging lens group being shifted toward an image so as to focus said fast telephoto lens on a close distance object, said first converging lens group including at least two positive lens components and one negative lens component which are sequentially arranged from the object side, said diverging lens group including two negative lens components at least one of which consists of an achromatic lens component constituted by a positive lens and a negative lens, said second converging lens group including at least one achromatic lens component constituted by a negative lens and a positive lens, and said fast telephoto lens satisfying conditions below:

$$0.7f \leq f_1 < f$$

$$-0.5 < (rd + rc)/(rd - rc) < 0$$

$$0.12f \leq f_2 \leq 0.48f$$

$$-1.50 \leq (rb + ra)/(rb - ra) \leq -0.50$$

$$0.01 < d_4/f_1 < 0.09$$

$$0.1 < na - nb < 0.35$$

$$18 < vb - va$$

where
f: overall focal length of said fast telephoto lens
$f_1$: focal length of said first converging lens group
rc: radius of curvature of a surface of the negative lens component of said diverging lens group that is located nearer the image, the surface being the closest to the object
rd: radius of curvature of a surface of the negative lens component of said diverging lens group that is located nearer the image, the surface being that closest to the image
$f_2$: focal length of said diverging lens group
ra: radius of curvature of a surface of the negative lens component of said diverging lens group that is located nearer the object, the surface being that closest to the object
rb: radius of curvature of a surface of the negative lens component of said diverging lens group that is located nearer the object, the surface being that closest to the image
$d_4$: a second space in said first converging lens group
na: refractive index of the positive lens of the achromatic component of said diverging lens group, the positive lens being located near the object
nb: refractive index of the negative lens of the achromatic component of said diverging lens group, the negative lens being located near the object
va: Abbe number of the positive lens of the achromatic component of said diverging lens group, the positive lens being located near the object
vb: Abbe number of the negative lens of the achromatic component of said diverging lens group, the negative lens being located near the object.

10. A fast telephoto lens according to claim 9, characterized by the following data:

| f = 300 | F-number 2.0 | | | |
|---|---|---|---|---|
| r1=213.382 | d1=23.000 | n1=1.49782 | v1=82.3 | |
| r2=−738.293 | d2=0.300 | | | |
| r3=168.324 | d3=23.000 | n2=1.49782 | v2=82.3 | G1 |
| r4=−848.097 | d4=8.200 | | | |
| r5=−531.204 | d5=8.100 | n3=1.75692 | v3=31.7 | |
| r6=41.072 | d6=91.540 | | | |
| r7=−7864!019 | d7=7.900 | n4=1.79886 | v4=34.1 | |
| r8=−105.904 | d8=3.000 | n5=1.51454 | v5=54.6 | |
| r9=193.539 | d9=10.450 | | | G2 |
| r10=−114.709 | d10=3.950 | n6=1.46450 | v6=65.8 | |
| r11=86.161 | d11=31.231 | | | |
| r12=376.118 | d12=1.500 | n7=1.68893 | v7=31.1 | |
| r13=100.0 | d13=7.000 | n8=1.69350 | v8=53.8 | |
| r14=−1707.134 | d14=2.000 | | | |
| r15=224.029 | d15=2.350 | n9=1.69895 | v9=30.1 | G3 |
| r16=130.0 | d16=8.500 | n10=1.69680 | v10=55.6 | |
| r17=−205.257 | | | | |
| Bf=111.055 | | | | | where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; v1, v2, v3, ... are the Abbe numbers of respective lenses in order from the object side; and Bf is the back focal length of the telephoto lens.

11. A fast telephoto lens according to claim 9, characterized by the following data:

| f = 300 | F-number 2.0 | | | |
|---|---|---|---|---|
| r1=396.963 | d1=15.00 | n1=1.62041 | v1=60.3 | |
| r2=−856.209 | d2=0.400 | | | |
| r3=169.663 | d3=25.00 | n2=1.49782 | v2=82.3 | |
| r4=−848.700 | d4=2.350 | | | G1 |
| r5=−708.000 | d5=5.000 | n3=1.75692 | v3=31.7 | |
| r6=295.194 | d6=1.400 | | | |
| r7=171.269 | d7=16.000 | n4=1.49782 | v4=82.3 | |
| r8=686.191 | d8=78.913 | | | |
| r9=1756.745 | d9=10.000 | n5=1.79504 | v5=28.6 | |
| r10=−140.240 | d10=3.000 | n6=1.51454 | v6=54.6 | |
| r11=138.770 | d11=9.626 | | | G2 |
| r12=−165.595 | d12=3.950 | n7=1.58913 | v7=61.2 | |
| r13=87.786 | d13=23.602 | | | |
| r14=628.332 | d14=1.500 | n8=1.68893 | v8=31.1 | |
| r15=130.000 | d15=7.000 | n9=1.69350 | v9=53.8 | |
| r16=−727.144 | d16=2.000 | | | G3 |
| r17=254.899 | d17=2.350 | n10=1.69895 | v10=30.1 | |
| r18=127.000 | d18=8.500 | n11=1.69680 | v11=55.6 | |
| r19=−169.604 | Bf=110.073 | | | | where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; v1, v2, v3, ... are the Abbe numbers of respective lenses in order from the object side; and Bf is the back focal length of the telephoto lens.

12. A fast telephoto lens according to claim 9, characterized by the following data:

| f = 300 | F-number 2.0 | | | |
|---|---|---|---|---|
| r1=196.956 | d1=23.000 | n1=1.49782 | v1=82.3 | |
| r2=−1307.161 | d2=0.300 | | | |
| r3=195.829 | d3=23.000 | n2=1.49782 | v2=82.3 | G1 |
| r4=−516.352 | d4=9.035 | | | |
| r5=−380.362 | d5=8.100 | n3=1.75692 | v3=31.7 | |

-continued

| | f = 300  F-number  2.0 | | | |
|---|---|---|---|---|
| r6=721.299 | d6=94.902 | | | |
| r7=−2258.410 | d7=10.000 | n4=1.79886 | ν4=34.0 | |
| r8=−117.177 | d8=2.000 | | | |
| r9=−101.703 | d9=3.000 | n5=1.46450 | ν5=65.8 | |
| r10=148.618 | d10=20.495 | | | G2 |
| r11=−95.192 | d11=5.000 | n6=1.69350 | ν6=53.8 | |
| r12=−61.177 | d12=3.950 | n7=1.51118 | ν7=50.9 | |
| r13=93.433 | d13=24.547 | | | |
| r14=98.544 | d14=10.000 | n8=1.62041 | ν8=60.3 | |
| r15=−121.912 | d15=3.300 | | | |
| r16=−261.503 | d16=5.000 | n9=1.62041 | ν9=60.3 | |
| r17=−102.467 | d17=3.000 | | | |
| r18=−92.976 | d18=3.000 | n10=1.75520 | ν10=27.6 | |
| r19=−511.672 | d19=8.000 | | | G3 |
| r20=−70.661 | d20=3.000 | n11=1.80518 | ν11=25.4 | |
| r21=−94.501 | d21=0.090 | | | |
| r22=88.159 | d22=10.000 | n12=1.60342 | ν12=38.1 | |
| r23=−100.000 | d23=3.000 | n13=1.62041 | ν13=60.3 | |
| r24=357.774 | Bf=46.847 | | | | where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; ν1, ν2, ν3, ... are the Abbe numbers of respective lenses in order from the object side; and Bf is the back focal length of the telephoto lens.

13. A fast telephoto lens according to claim 9, characterized by the following data:

| | f = 300  F-number  2.0 | | | |
|---|---|---|---|---|
| r1=443.373 | d1=14.500 | n1=1.49782 | ν1=82.3 | |
| r2=−745.663 | d2=0.500 | | | |
| r3=235.410 | d3=21.000 | n2=1.49782 | ν2=82.3 | |
| r4=−599.816 | d4=6.850 | | | |
| r5=−527.848 | d5=6.000 | n3=1.74950 | ν3=35.2 | G1 |
| r6=473.787 | d6=1.700 | | | |
| r7=176.900 | d7=15.000 | n4=1.49782 | ν4=82.3 | |
| r8=558.189 | d8=102.701 | | | |
| r9=749.672 | d9=8.000 | n5=1.79504 | ν5=28.6 | |
| r10=−189.496 | d10=3.650 | n6=1.51454 | ν6=54.6 | |
| r11=125.271 | d11=12.000 | | | G2 |
| r12=−148.765 | d12=4.800 | n7=1.46450 | ν7=65.8 | |
| r13=97.985 | d13=28.388 | | | |
| r14=−1754.216 | d14=1.500 | n8=1.68893 | ν8=31.1 | |
| r15=110.000 | d15=7.750 | n9=1.69350 | ν9=53.8 | |
| r16=−317.940 | d16=2.000 | | | |
| r17=169.454 | d17=2.400 | n10=1.69895 | ν10=30.1 | G3 |
| r18=113.525 | d18=8.000 | n11=1.69680 | ν11=55.6 | |
| r19=−254.060 | Bf=112.223 | | | | where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; ν1, ν2, ν3, ... are the Abbe numbers of respective lenses in order from the object side; and Bf is the back focal length of the telephoto lens.

14. A fast telephoto lens according to claim 9, characterized by the following data:

| | f = 400  F-number  2.8 | | | |
|---|---|---|---|---|
| r1=366.543 | d1=15.000 | n1=1.49782 | ν1=82.3 | |
| r2=−644.512 | d2=.000 | | | |
| r3=213.552 | d3=21.000 | n2=1.49782 | ν2=82.3 | |
| r4=−441.810 | d4=5.000 | | | |
| r5=−394.853 | d5=4.800 | n3=1.74950 | ν3=35.2 | G1 |
| r6=432.180 | d6=1.300 | | | |
| r7=156.381 | d7=14.000 | n4=1.49782 | ν4=82.3 | |
| r8=1095.641 | d8=86.847 | | | |
| r9=−46400.000 | d9=7.000 | n5=1.78470 | ν5=26.1 | |
| r10=−139.436 | d10=2.500 | n6=1.65160 | ν6=58.5 | |
| r11=128.330 | d11=10.000 | | | G2 |
| r12=−172.383 | d12=3.500 | n7=1.51680 | ν7=64.1 | |
| r13=104.035 | d13=18.449 | | | |
| r14=487.163 | d14=1.500 | n8=1.67163 | ν8=38.9 | |
| r15=98.542 | d15=10.000 | n9=1.59319 | ν9=67.9 | |
| r16=−100.861 | d16=25.500 | | | |
| r17=∞ | d17=2.000 | n10=1.51680 | ν10=64.1 | G3 |
| r18=∞ | d18=7.700 | | | |
| r19=−161.289 | d19=2.800 | n11=1.78797 | ν11=47.5 | |
| r20=−458.625 | d20=1.000 | | | |
| r21=609.162 | d21=5.700 | n12=1.53172 | ν12=49.1 | |
| r22=−191.968 | Bf=111.255 | | | | where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; ν1, ν2, ν3, ... are the Abbe numbers of respective lenses in order from the object side; and Bf is the back focal length of the telephoto lens.

15. A fast telephoto lens according to claim 9, characterized by the following data:

| | f = 400  F-number  2.8 | | | |
|---|---|---|---|---|
| r1=404.620 | d1=12.400 | n1=1.49782 | ν1=82.3 | |
| r2=−739.128 | d2=.500 | | | |
| r3=229.061 | d3=19.000 | n2=1.49782 | ν2=82.3 | |
| r4=−576.364 | d4=6.500 | | | |
| r5=−504.589 | d5=5.700 | n3=1.74950 | ν3=35.2 | G1 |
| r6=450.293 | d6=1.600 | | | |
| r7=174.251 | d7=14.300 | n4=1.49782 | ν4=82.3 | |
| r8=610.132 | d8=102.683 | | | |
| r9=774.302 | d9=7.500 | n5=1.79504 | ν5=28.6 | |
| r10=−170.747 | d10=3.400 | n6=1.51454 | ν6=54.6 | |
| r11=112.007 | d11=11.200 | | | G2 |
| r12=−135.143 | d12=4.500 | n7=1.46450 | ν7=65.8 | |
| r13=98.477 | d13=25.175 | | | |
| r14=537.096 | d14=1.500 | n8=1.67163 | ν8=38.9 | |
| r15=109.866 | d15=9.700 | n9=1.59319 | ν9=67.9 | |
| r16=−106.723 | d16=26.000 | | | |
| r17=∞ | d17=2.000 | n10=1.51680 | ν10=64.1 | G3 |
| r18=∞ | d18=7.800 | | | |
| r19=−180.104 | d19=2.900 | n11=1.79631 | ν11=41.0 | |
| r20=−975.725 | d20=1.000 | | | |
| r21=119.226 | d21=5.800 | n12=1.53172 | ν12=49.1 | |
| r22=3284.360 | Bf=113.852 | | | | where r1, r2, r3, ... are radii of curvature of successive lens surfaces in order from the object side; d1, d2, d3, ... are thicknesses at the centers of respective lenses and lens distances in order from the object side; n1, n2, n3, ... are refractive indices of respective lenses with respect to the d-line (λ=587.6 nm) in order from the object side; ν1, ν2, ν3, ... are the Abbe numbers of respective lenses in order from the object side; and Bf is the back focal length of the telephoto lens.

* * * * *